United States Patent
Robinson et al.

(10) Patent No.: US 11,619,261 B2
(45) Date of Patent: Apr. 4, 2023

(54) BEARING ASSEMBLY, ASSOCIATED METHOD OF DAMPING, AND DAMPER RING THEREOF

(71) Applicant: PRATT & WHITNEY CANADA CORP., Longueuil (CA)

(72) Inventors: Ronald Leslie Robinson, Brampton (CA); Audrey Brouillet, Saint-Basile-le-Grand (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 120 days.

(21) Appl. No.: 17/066,848

(22) Filed: Oct. 9, 2020

(65) Prior Publication Data

US 2022/0112919 A1 Apr. 14, 2022

(51) Int. Cl.
*F16C 27/04* (2006.01)
*F01D 25/16* (2006.01)

(52) U.S. Cl.
CPC .......... *F16C 27/045* (2013.01); *F01D 25/164* (2013.01); *F05D 2240/50* (2013.01); *F16C 2360/23* (2013.01)

(58) Field of Classification Search
CPC .. F16C 27/045; F16C 2360/23; F01D 25/164; F16F 15/0237; F05D 2240/50; F16J 9/20
See application file for complete search history.

(56) References Cited

U.S. PATENT DOCUMENTS

| | | | |
|---|---|---|---|
| 2,297,112 A | 9/1942 | Phillips | |
| 5,067,825 A | 11/1991 | Vance et al. | |
| 5,106,208 A | 4/1992 | Bobo et al. | |
| 5,197,807 A | 3/1993 | Kuznar | |
| 2019/0153896 A1* | 5/2019 | Ganiger | F16C 27/045 |
| 2019/0186296 A1* | 6/2019 | Orkiszewski | F01D 25/18 |
| 2019/0186492 A1* | 6/2019 | Liu | F04C 29/02 |

FOREIGN PATENT DOCUMENTS

FR 2979681 3/2013

* cited by examiner

*Primary Examiner* — Alan B Waits
(74) *Attorney, Agent, or Firm* — Norton Rose Fulbright Canada LLP

(57) ABSTRACT

The bearing assembly can extend between a rotor and a housing, have a plurality of bearing rolling elements mounted for rotation within a bearing ring, an oil damper cavity between the bearing ring and the housing, an oil inlet path to feed the oil damper cavity, and at least one damper ring defining a corresponding axial limit to the oil damper cavity and having a radially inner edge received in a corresponding annular groove defined in the bearing ring, and a radially outer edge having at least one arc portion extending radially outwardly relative the annular groove and engaging the housing, and at least one controlled leakage portion radially recessed from the housing and forming a leakage path leading axially out from the oil damper cavity.

16 Claims, 3 Drawing Sheets

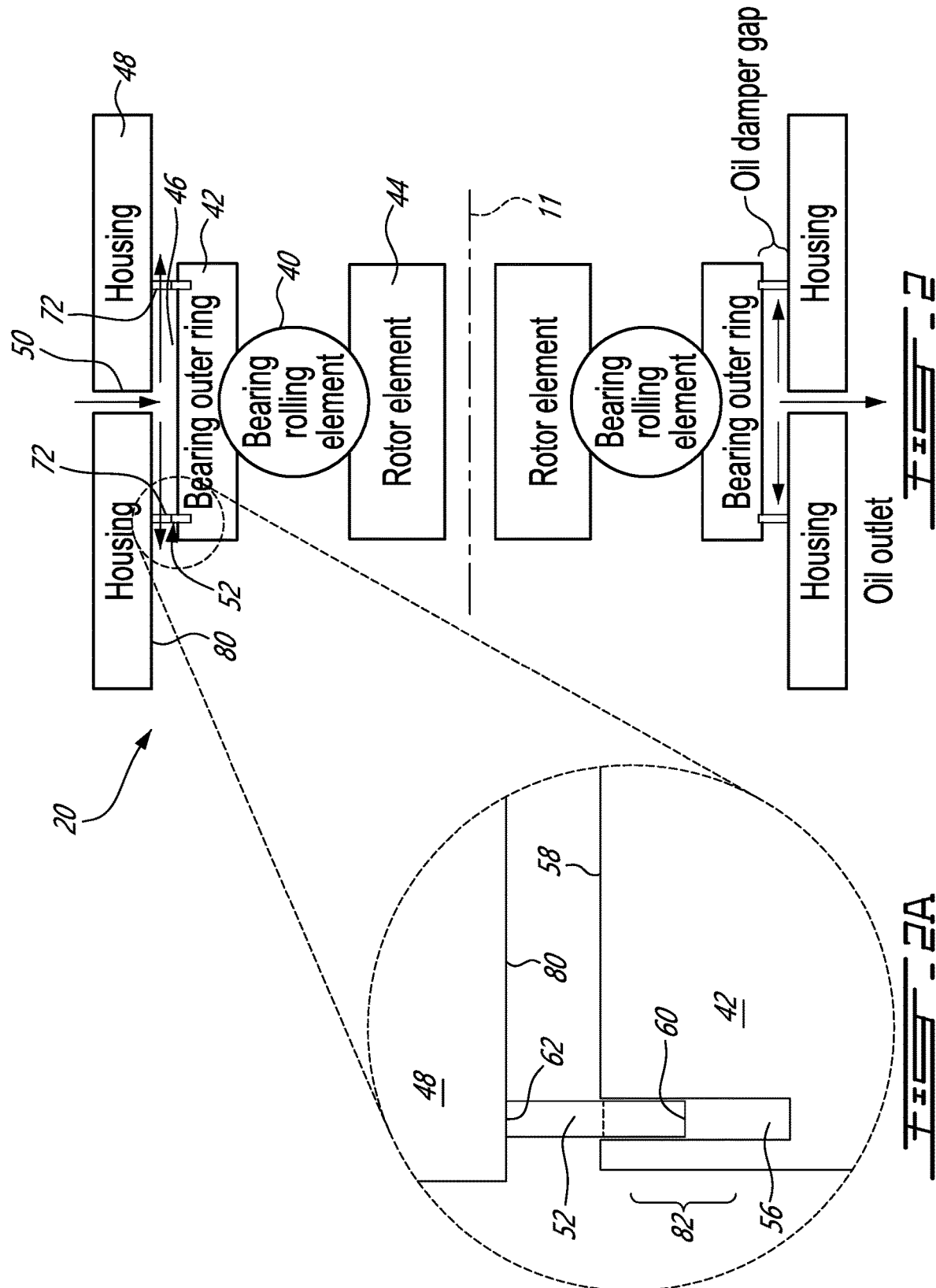

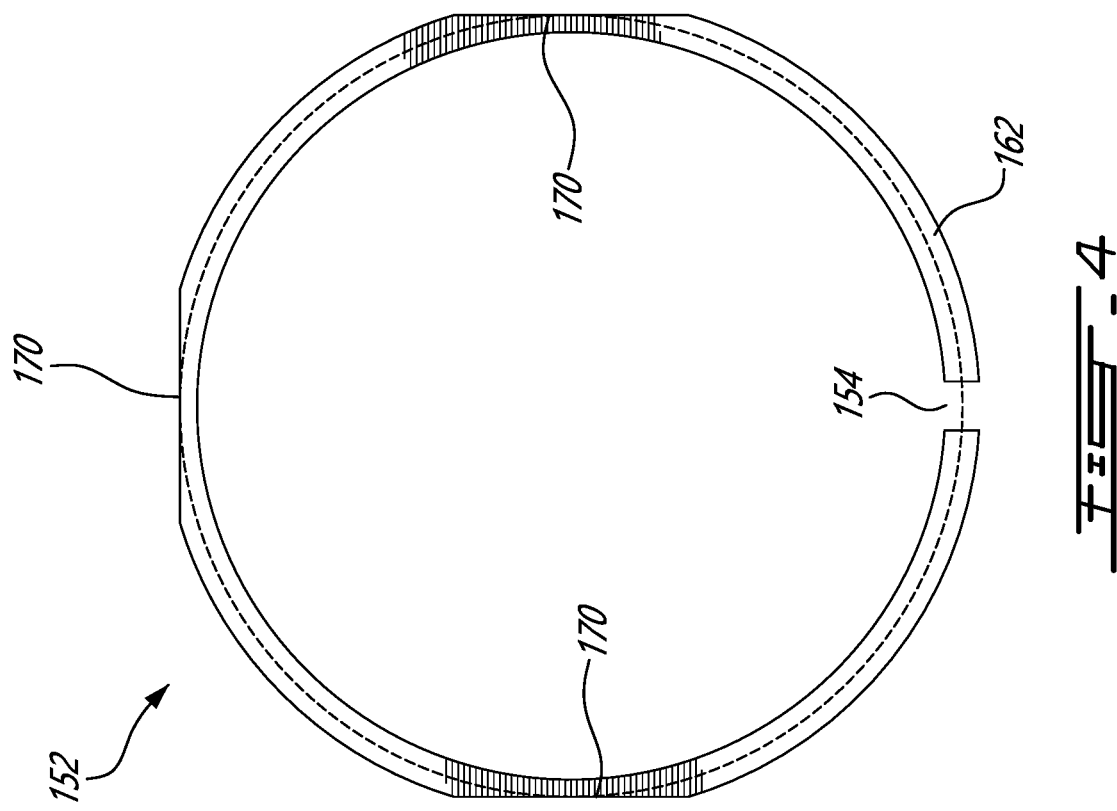
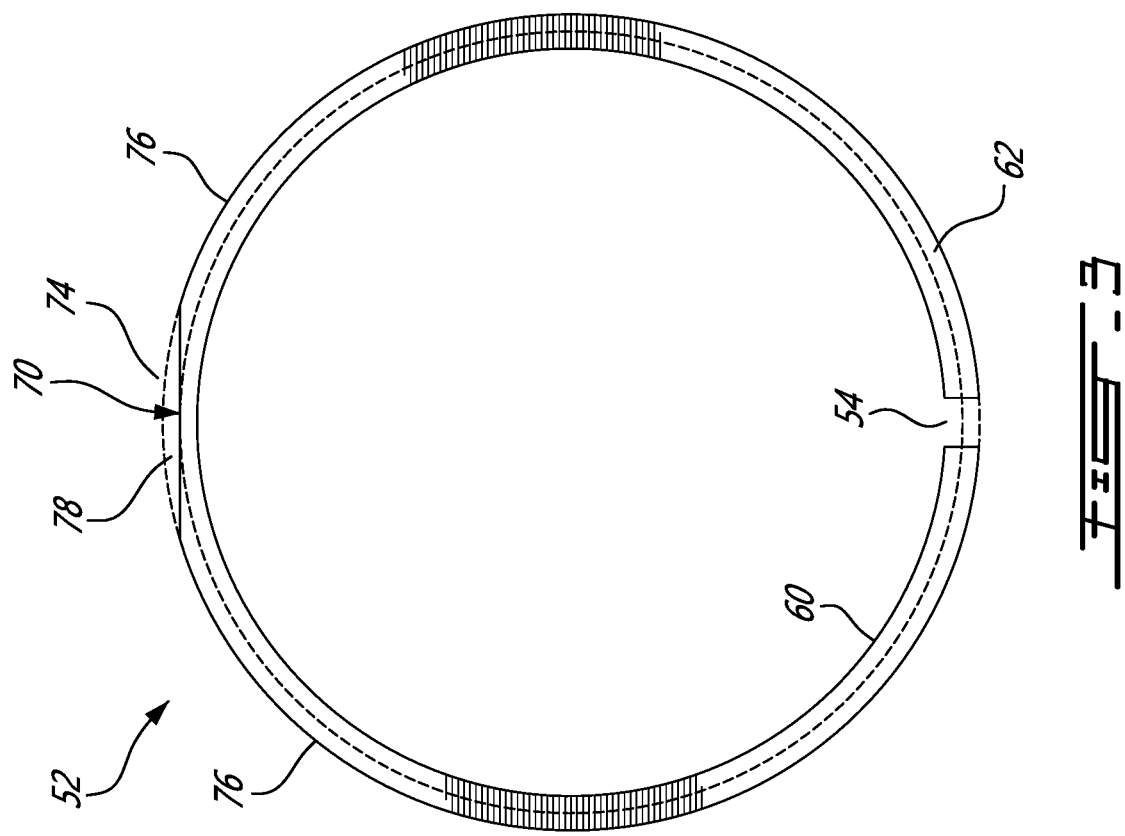

BEARING ASSEMBLY, ASSOCIATED METHOD OF DAMPING, AND DAMPER RING THEREOF

TECHNICAL FIELD

The application relates generally to turbomachinery and, more particularly, to bearing assemblies thereof.

BACKGROUND OF THE ART

In turbomachinery, it is common to have rotors mounted within housings (which can be a stator or another rotating component) via bearings, to provide low friction rotation ability between the components. The bearings typically include a plurality of rolling elements, such as balls or rollers, circumferentially distributed between an outer ring and an inner ring. The inner ring can be fixed relative to the rotor. In some cases, the rotor can generate repeated occurrences of radial forces within the bearing, such as can be due to minute misalignment between the rotor's axis of rotation and the rotating components' centers of mass. Such radial forces transmitted through the bearings can lead to undesired vibrations. It was known, to a certain extent, to dampen such repeated occurrences of radial forces by introducing an oil damper cavity between the housing and the bearing outer ring. The oil damper cavity can be designed to be fed with a certain flow rate of oil during operation, and to accommodate a certain extent of relative radial displacement between the bearing outer ring and the housing by pressure variation. While such oil damper cavities were suitable to a certain extent, there always remains room for improvement, such as in finding ways to provide more optimal levels of stiffness for specific applications.

SUMMARY

In one aspect, there is provided a bearing assembly extending between a rotor and a housing, the bearing assembly comprising a plurality of bearing rolling elements mounted for rotation within a bearing ring, and an oil damper cavity between the bearing ring and the housing, an oil inlet path to feed the oil damper cavity, at least one damper ring defining a corresponding axial limit to the oil damper cavity, the at least one damper ring having a radially inner edge received in a corresponding annular groove defined in the bearing ring, and a radially outer edge having at least one arc portion extending radially outwardly relative the annular groove and engaging the housing, and at least one controlled leakage portion radially recessed from the housing and forming a leakage path leading axially out from the oil damper cavity.

In another aspect, there is provided a damper ring for use in a bearing assembly extending between a rotor and a housing and having a plurality of bearing rolling elements mounted for rotation within a bearing ring, and an oil damper cavity between the bearing ring and the housing, the damper ring having a radially inner edge configured to be received in a corresponding annular groove formed in a radially outer surface of the bearing ring, and a radially outer edge having at least one arc portion configured to extend radially outwardly relative the radially inner end and engage the housing, and at least one controlled leakage portion radially recessed from a circular projection of the at least one arc portion and configured to form a leakage path leading axially out from the oil damper cavity.

In a further aspect, there is provided a method of damping relative movement between a rotor and a housing, the method comprising: feeding oil into an oil damper cavity extending radially between a bearing ring and the housing, and axially along an outer face of the bearing ring the oil damper cavity being terminated at least at one axial end by a damper ring; allowing a controlled leakage flow axially across a spacing formed radially between at least one controlled leakage flow portion of a radially outer edge of the damper ring and the housing.

DESCRIPTION OF THE DRAWINGS

Reference is now made to the accompanying figures in which:

FIG. 2 is a schematic cross-sectional view of a bearing assembly of the gas turbine engine of FIG. 1, in accordance with one example;

FIG. 2A presents a portion of FIG. 2 enlarged, and showing detail,

FIG. 3 is a cross-sectional view of a damper ring taken in a transversal plane, in accordance with one example, FIG. 4 is another cross-sectional view of a damper ring, in accordance with another example.

DETAILED DESCRIPTION

Figure 1:
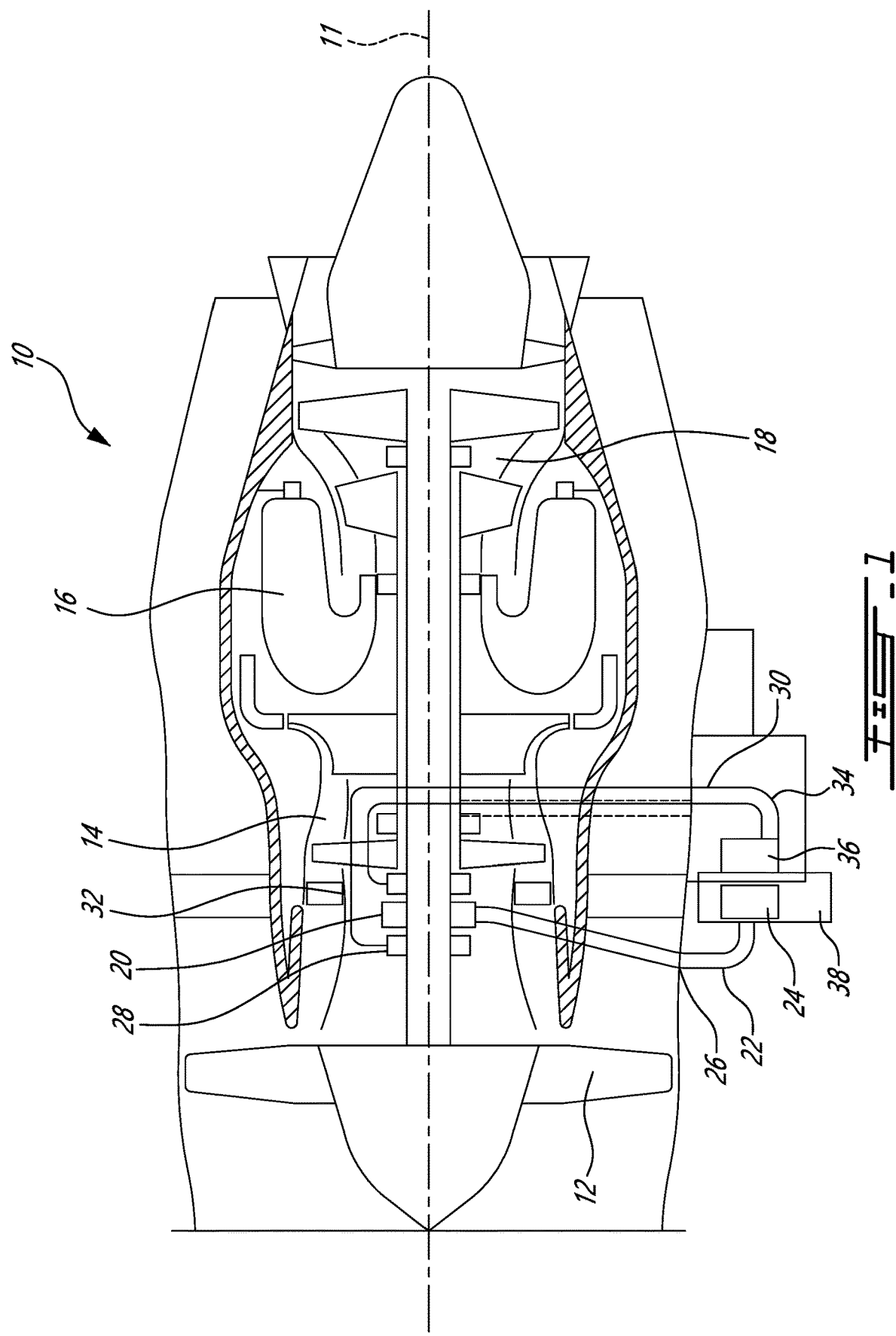
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The compressor 14, fan 12 and turbine 18 have rotating components which can be mounted on one or more shafts. Bearings 20 are used to provide smooth relative rotation between a shaft and casing (non-rotating component), and/or between two shafts which rotate at different speeds. An oil lubrication system 22 including an oil pump 24, sometimes referred to as a main pump, and a network of conduits and nozzles 26, is provided to feed the bearings 20 with oil. Seals 28 are used to contain the oil. A scavenge system 30 having cavities 32, conduits 34, and one or more scavenge pumps 36, is used to recover the oil, which can be in the form of an oil foam at that stage, from the bearings 20. The oil pump 24 typically draws the oil from an oil reservoir 38, and it is relatively common to use some form of air/oil separating device in the return line.

FIG. 2 presents an example of a bearing assembly 20. The bearing assembly 20 includes a plurality of rolling elements 40, such as balls or rollers, circumferentially distributed between an outer ring 42 and an inner ring. The inner ring is provided as part of the rotor 44 in this example. An oil damper cavity 46 is provided between a housing 48 and the bearing outer ring 42. The oil damper cavity 46 is designed to be fed with a certain, typically varying, flow rate of oil during operation via one or more oil path 50, which can extend across the housing 48 for instance, and having an oil path outlet leading into the oil damper cavity 46. The oil damper cavity 46 can accommodate a certain extent of relative radial displacement between the bearing outer ring 42 and the housing 48 via oil pressure variations. Depending on the embodiment, the outer race can be centralized by a squirrel cage or located radially only by the damper housing.

Various schemes can be used to evacuate the oil from the oil damper cavity 46. In one embodiment, the oil can leak freely out of both axial ends of the oil damper cavity 46 (i.e. the axial ends can be open), which can lead to a relatively low stiffness. In other embodiments, it can be preferred to close one or both axial ends. Leakage can be impeded by using a ring, which will be referred to herein as a damper ring 52, to axially terminate one, or both, axial ends of the oil damper cavity 46. The damper ring(s) 52 can be annular in shape except for a circumferential assembly gap 54, 154, best seen in FIGS. 3 and 4, and defined between two circumferential ends. The gap 54, 154 can be used to spring the damper ring open during assembly, so as to snap it into an annular groove 56 formed in the bearing ring 42, for instance. The damper ring(s) 52 can be made of any suitable material, such as metal (e.g. cast iron) or plastic, and some high-temperature plastics such as Vespel can be useful in some embodiments. The damper ring(s) 52 can be disposed within an annular groove 56 extending around the radially outer surface 58 of the bearing outer ring 42, and thereby be axially trapped by the groove 56.

The damper rings 52 can have a radially inner edge 60 extending into the annular groove 56, and a radially outer edge 62 protruding radially outwardly from the annular groove 56 and engaging the housing 48. The radially outer edge 62 can be a smooth, circular/cylindrical surface, except for the minor discontinuity stemming from the circumferential gap 54, 154, or include a plurality of arc portions interspaced by one or more controlled leakage portions 70, 170 as will be detailed below. Damper rings 52 can be used to form one or two axial terminations 72 to the oil damper cavity 46, and its presence can severely impede leakage, and thereby lead to a significantly stiffer connection. The stiffness of the bearing assembly 20 can also be adjusted to a certain extent by varying the axial length and the thickness of the oil damper cavity 46.

However, in some embodiments, the open end oil damper cavity configuration may lead to an unsatisfactorily low stiffness, whereas the closed end oil damper cavity configuration (e.g. two damper rings) may lead to an unsatisfactorily high stiffness, leaving a want for an intermediate level of stiffness better adapted to some embodiments. It was found that in some embodiments, such an intermediate level of stiffness could be achieved by using one or more damper ring (e.g. 52, 152) intentionally designed with one or more controlled leakage portion (e.g. 70, 170). The controlled leakage portion(s) can be formed of a portion of the radially outer edge 62 which, instead of conforming to an otherwise circular/cylindrical perimeter geometry, is radially recessed to form a spacing with the housing 48. A controlled leakage portion can be formed of a flat, or planar portion extending circumferentially between two arc portions, an example of which is presented in FIG. 3, or of a semicircular "bite" extending circumferentially between two arc portions, an example of which is presented in FIG. 4, to name two of numerous possible examples. As will be understood in view of the above, the controlled leakage portion can be defined as a portion of the radially outer edge which is radially inwardly recessed relative to a virtual reference, the virtual reference being a circle 74 matching the shape of the arc portions 76 of the radially outer edge, outside of the one or more controlled leakage portions 70.

When in its position of use, extending circumferentially around the bearing outer ring 42 and radially between the bearing outer ring 42 and housing 48 in a manner to form an axial termination 72 to the oil damper cavity 46, the controlled leakage portion forms a radial opening, or spacing 78, between the corresponding portion of the damper ring outer edge 62 and the radially inner wall 80 of the housing 48, through which a controlled flow rate of oil can escape.

In practice, the damper ring 52 can be snapped into a corresponding annular groove 56 extending radially into an otherwise cylindrical outer surface 58 of the bearing outer ring 42, as perhaps best shown in FIG. 2A. The damper ring's radially outer edge 62, except for the controlled leakage portions 70, 170, can be designed with an arc shape in a manner to maintain an abutting engagement with the radially inner wall 80 of the housing 48, while the damper ring's radially inner edge 60 penetrates partially into the groove 56. Indeed, the groove 56 can be deeper than the average expected radial position of the radially inner edge 60 in a manner to allow for an expected radial travel distance 82 between the radially inner edge 60 of the damper ring 52 and the bottom of the annular groove 56 as the bearing outer ring 42 moves radially relative to the housing 48. The circular, or rather arc portions 76 of the radially outer surface 62 can thus maintain an engagement with the radially inner surface 80 of the housing 48 during operation, blocking or severely impeding the axial flow of oil therethrough, whereas the controlled leakage portions 70 of the radially outer surface 62 can be maintained spaced apart from the radially inner surface 80 of the housing 48 at all times by the arc portions 76, and thereby form a gap 78 through which controlled amounts of oil can leak in the axial orientation.

FIG. 3 shows an example of a damper ring 52 viewed from the front as opposed to the transversal cross-section views of FIGS. 2A and 2B. In this example, the damper ring 52 has a single controlled leakage portion 70. The controlled leakage portion 70 is provided in the form of a flat, planar, portion of the radially outer edge 62 of the damper ring 52. More precisely, the planar portion of the radially outer edge 62 can be seen to be recessed relative to a virtual reference 74 corresponding to the otherwise circular geometry of the remainder of the radially outer edge 62. In this embodiment, at its maximum depth, the planar portion can be recessed from the virtual circular reference 74 by a distance corresponding to the expected average distance between the radially inner surface 80 of the housing 48 and the radially outer surfaces 58 of the bearing ring 42 adjacent to the groove 56, in a manner for the depth of the planar portion to roughly match the radial location of the radially outer surfaces 58 of the bearing ring 42 adjacent the groove 56 on average, for example. In this example, there is a single controlled leakage portion 70, as a single controlled leakage portion can be suitable for some embodiments, and the single controlled leakage portion 70 is strategically positioned diametrically opposite to the circumferential gap 54 between the two circumferential ends of the damper ring 52. This strategic diametrically opposite positioning can be useful to balance the oil leakage flow around the circumference of the damper ring 52, for instance, as some oil leakage flow can be expected to occur through the circumferential gap 54.

FIG. 4 shows another example of a damper ring 152. In this example, the damper ring 152 has three controlled leakage portions 170. The controlled leakage portions are all provided in the form of an arc-shaped recessed portion of the radially outer edge 162 of the damper ring 162. More precisely, the controlled leakage portions 170 of the radially outer edge 162 can be seen to be recessed relative to a virtual reference corresponding to the otherwise circular geometry of the remainder of the radially outer edge, or more specifically the arc portions. In this embodiment, at its maximum, the controlled leakage portions can be recessed from the virtual circular reference by a distance corresponding to the expected average distance between the radially inner surface 80 of the housing 48 and the radially outer surfaces 58 of the bearing ring 42 adjacent to the groove 56, in a manner for the depth of the to roughly match the radial location of the radially outer surfaces 58 of the bearing ring 42 adjacent the groove 56 on average, for example.

It will be noted that although in both examples presented, the depth of the recess forming the controlled leakage portion corresponded to the mean radial position of the bearing outer ring outer face during use, it will be understood that the depth can be different in alternate embodiments.

Turning back to FIG. 2, it will be understood that in the example presented in FIG. 2, two damper rings are used, including a fore damper ring and a rear damper ring. The two damper rings are seated in corresponding annular grooves: a fore annular groove and a rear annular groove. The two damper rings are axially interspaced from one another during use, and form corresponding axial limits to the oil damper cavity. It will be understood that in alternate embodiments, the only one damper ring may be required instead of two. Moreover, in the specific embodiment presented in FIG. 2, an oil inlet path is formed through the housing, which is illustrated as having a single conduit, but which may have more than one conduit in alternate embodiments. The specific embodiment presented in FIG. 2 also uses an oil outlet path, but it will be understood that the oil outlet path is optional, and that in alternate embodiments where the leakage through the controlled leakage portions is deemed sufficient, the oil outlet path may be omitted.

During operation of an embodiment such as presented in FIG. 2, the rotor element 44 rotates relative to the housing 48. The rotation is achieved in a relatively low friction manner by way of the bearing rolling elements 40 which individually rotate as they collectively travel along a circular path around the rotor element 44, rolling between the rotor element 44 and the bearing outer ring 42. The bearing outer ring 42 can oscillate, or orbit, within the housing 48 to a certain degree, and as opposed to a rigid connection, such as making the bearing outer ring integral to the housing, the presence of the oil damper cavity 46 allows to accommodate a certain degree of oscillation, and dampen the transmission of any forces transmitted to the housing 48. The degree of stiffness can be tuned, to a certain extent, by way of selecting the thickness and the axial length of the oil damper cavity 46, but also by selecting the size, shape, number, and configuration of controlled leakage portion(s) formed in one, or both, damper rings.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications than the ones presented above could be implemented by a person of ordinary skill in the art in view of the present disclosure, which modifications would be within the scope of the present technology.

The invention claimed is:

1. A bearing assembly extending between a rotor and a housing, the bearing assembly comprising a plurality of bearing rolling elements mounted for rotation within a bearing ring, an oil damper cavity between the bearing ring and the housing, an oil inlet path to feed the oil damper cavity, and at least one damper ring defining a corresponding axial limit to the oil damper cavity, the at least one damper ring having
 a circumferential assembly gap between two circumferential ends;
 a radially inner edge received in a corresponding annular groove defined in the bearing ring, and
 a radially outer edge having at least one arc portion extending radially outwardly relative the annular groove and engaging the housing, and at least one controlled leakage portion radially recessed from the housing and forming a leakage path leading axially out from the oil damper cavity, the at least one controlled leakage portion having a circumferential width greater than that of the circumferential assembly gap, the controlled leakage portion provided in the form of a planar portion of the outer edge.

2. The bearing assembly of claim 1, wherein the planar portion of the outer edge is normal to the radial orientation.

3. The bearing assembly of claim 1, comprising a plurality of controlled leakage portions circumferentially interspaced from one another along a periphery of the outer edge.

4. The bearing assembly of claim 1 comprising two of said damper rings, said two damper rings forming respective axial limits to the oil damper cavity and engaged in corresponding annular grooves.

5. The bearing assembly of claim 1 further comprising an oil outlet path leading out from the oil damper cavity across the housing.

6. The bearing assembly of claim 1 wherein one of said at least one controlled leakage portion is diametrically opposite the circumferential assembly gap.

7. The bearing assembly of claim 1 wherein the oil inlet path includes at least one conduit extending across the housing.

8. A gas turbine engine comprising a bearing assembly extending between a rotor and a housing and having a plurality of bearing rolling elements mounted for rotation within a bearing ring, and an oil damper cavity between the bearing ring and the housing, a damper ring defining a corresponding axial limit to the oil damper cavity, the damper ring having
 a circumferential assembly gap between two circumferential ends;
 a radially inner edge configured to be received in a corresponding annular groove formed in a radially outer surface of the bearing ring, and
 a radially outer edge having at least one arc portion configured to extend radially outwardly relative the radially inner end and engage the housing, and at least one controlled leakage portion radially recessed from a circular projection of the at least one arc portion and configured to form a leakage path leading axially out from the oil damper cavity, the at least one controlled leakage portion having a circumferential width greater than that of the circumferential assembly gap, the controlled leakage portion provided in the form of a planar portion of the outer edge.

9. The gas turbine engine of claim 8, wherein the planar portion of the outer edge is normal to the radial orientation.

10. The gas turbine engine of claim 8, comprising a plurality of controlled leakage portions circumferentially interspaced from one another along a periphery of the outer edge.

11. The gas turbine engine of claim 8 wherein one of said at least one controlled leakage portion is diametrically opposite the circumferential assembly gap.

12. A method of damping relative movement between a rotor and a housing, the method comprising:

feeding oil into an oil damper cavity extending radially between a bearing ring and the housing, and axially along an outer face of the bearing ring the oil damper cavity being terminated at least at one axial end by a damper ring, the damper ring having a circumferential assembly gap between two circumferential ends;

allowing a controlled leakage flow axially across a spacing formed radially between at least one controlled leakage flow portion of a radially outer edge of the damper ring and the housing, the at least one controlled leakage flow portion having a circumferential width greater than that of the circumferential assembly gap, the controlled leakage flow portion provided in the form of a planar portion of the outer edge.

13. The method of claim 12 wherein said allowing a controlled leakage flow includes allowing a controlled leakage flow across a plurality of said spacings, said plurality of spacings being circumferentially interspaced from one another.

14. The method of claim 12 wherein the damper cavity is terminated at both axial ends by corresponding damper rings, and said allowing a controlled leakage flow includes allowing a controlled leakage flow across spacings formed at both axial ends.

15. The method of claim 12 further comprising evacuating oil from the bearing cavity across the housing.

16. The method of claim 12 wherein said feeding oil includes feeding said oil across the housing.

* * * * *